(12) United States Patent
Pizzato et al.

(10) Patent No.: US 9,099,269 B2
(45) Date of Patent: Aug. 4, 2015

(54) ADAPTER FOR CONNECTING A SWITCH DEVICE TO A DATA BUS AND SWITCH ASSEMBLY COMPRISING THE ADAPTER

(71) Applicants: Marco Pizzato, Marostica (IT); Giuseppe Pizzato, Marostica (IT)

(72) Inventors: Marco Pizzato, Marostica (IT); Giuseppe Pizzato, Marostica (IT)

(73) Assignee: PIZZATO ELETTRICA S.R.L., Marostica (VI) (IT)

( * ) Notice: Subject to any disclaimer, the term of this patent is extended or adjusted under 35 U.S.C. 154(b) by 0 days.

(21) Appl. No.: 14/238,725

(22) PCT Filed: Jul. 4, 2013

(86) PCT No.: PCT/IB2013/055467
§ 371 (c)(1),
(2) Date: Feb. 12, 2014

(87) PCT Pub. No.: WO2014/006584
PCT Pub. Date: Jan. 9, 2014

(65) Prior Publication Data
US 2015/0109712 A1    Apr. 23, 2015

(30) Foreign Application Priority Data
Jul. 4, 2012   (IT) ............................... VI2012A0154

(51) Int. Cl.
*H01H 47/32*    (2006.01)
*H01H 50/08*    (2006.01)
*H01H 47/00*    (2006.01)

(52) U.S. Cl.
CPC ............. *H01H 47/001* (2013.01); *H01H 47/32* (2013.01); *H01H 50/08* (2013.01)

(58) Field of Classification Search
CPC ...... H01H 47/001; H01H 47/32; H01H 50/08
USPC .......................... 361/191; 200/329, 330, 331
See application file for complete search history.

(56) References Cited

U.S. PATENT DOCUMENTS

| | | | |
|---|---|---|---|
| 2003/0016103 A1* | 1/2003 | Haudry et al. | 335/9 |
| 2004/0093183 A1* | 5/2004 | Seel | 702/183 |
| 2009/0079552 A1* | 3/2009 | Flick | 340/426.17 |
| 2009/0325423 A1* | 12/2009 | Bollinger et al. | 439/638 |
| 2011/0181200 A1* | 7/2011 | Luk et al. | 315/294 |
| 2014/0124344 A1* | 5/2014 | Sorensen | 200/331 |

FOREIGN PATENT DOCUMENTS

| | | |
|---|---|---|
| EP | 1469495 | 10/2004 |
| WO | 0243189 | 5/2002 |

\* cited by examiner

*Primary Examiner* — Thienvu Tran
*Assistant Examiner* — Angela Brooks
(74) *Attorney, Agent, or Firm* — Themis Law

(57) ABSTRACT

An adapter configured to connect a switch device to a data bus, wherein the switch device has a box-like body which houses a switching unit for switching an electric circuit, wherein the adapter includes a case having a first opening and a second opening and an electronic control unit housed in the case and having a first connection element adapted to be connected to the switching unit through the first opening and second connection element adapted to be connected to the data bus through the second opening to convert the electric signals generated by the switching unit into data signals and vice versa.

8 Claims, 6 Drawing Sheets

ADAPTER FOR CONNECTING A SWITCH DEVICE TO A DATA BUS AND SWITCH ASSEMBLY COMPRISING THE ADAPTER

FIELD OF THE INVENTION

The present invention generally finds application in the field of electric control devices and particularly relates to an adapter for connecting a switch device to a data bus.

The invention further relates to a switch assembly comprising the adapter.

BACKGROUND ART

Switch devices designed for controlling one or more control and/or auxiliary circuits of an electrical system are known, which generally comprise a box-like casing having switch contacts therein that are adapted to be connected to the terminals of respective electric circuits for selectively closing/opening them upon actuation of an actuator.

Applications are also known in which these switch devices are connected to an electronic control unit, via one or more data buses, or field buses.

Particularly, in this special configuration each device has internally thereto electronic processing means, generally comprising an appropriately programmed electronic board, which are adapted to transduce the electric signals generated by the action of the switching means into digital signals to be transmitted to the electronic control unit through the field bus.

Conversely, the control unit may send certain signals to the device through the bus and the corresponding electronic board, to control the device, e.g. by controlling the actuation of the switching means, or to send queries and check its operating state and proper operation.

An example of such switch device is disclosed in EP1441580, which relates to a switch device connected to a field bus via a data line.

Particularly, the data line has a first section that extends from the switch device and is connected to a connection socket from which a second section of the data line extends to be connected to the field bus through an interface element.

The main drawback of these arrangements is that, in these prior art switch devices suitable to be connected to a field bus or another data line to communicate with a control unit, the processing means are integrated in their case.

Therefore, each device is designed for a particular use and has to be introduced in a system that uses a predetermined communication protocol.

Therefore, due to the impossibility of converting a switch device to a different application, a different type of device must be provided for each potential application, and this involves apparent problems and higher management and production costs.

DISCLOSURE OF THE INVENTION

The object of the present invention is to overcome the above drawbacks, by providing an adapter for connecting a switch device and a data bus that is highly efficient and relatively cost-effective.

A particular object of the present invention is to provide an adapter that allows connection of a switch device to a data bus even when the switch device has not been designed for this particular use, and has no processing means integrated internally thereof.

A further object of the present invention is to provide an adapter for connecting a switch device to a data bus that has a particularly small and compact size and can be easily connected to the most common types of switch devices, without changing the structure of the latter.

Yet another object of the present invention is to provide an adapter for connecting a switch device to a data bus that defines a particularly compact assembly when the device, once it has been coupled thereto.

These and other objects, as better explained hereafter, are fulfilled by an adapter for connecting a switch device to a data bus as defined hereinafter.

In a further aspect, the invention relates to a switch assembly comprising a switch device and an adapter according to the invention, wherein the switch device and the adapter comprise respective anchor means for mutual connection, which have mating shapes.

Advantageous embodiments of the invention are obtained in accordance with the dependent claims.

BRIEF DESCRIPTION OF THE DRAWINGS

Further features and advantages of the invention will become more apparent from the detailed description of a few preferred, non-exclusive embodiments of an adapter and a switch assembly according to the invention, which are described as non-limiting examples with the help with the accompanying drawings in which.

DETAILED DESCRIPTION OF A PREFERRED EMBODIMENT

Figure 1:
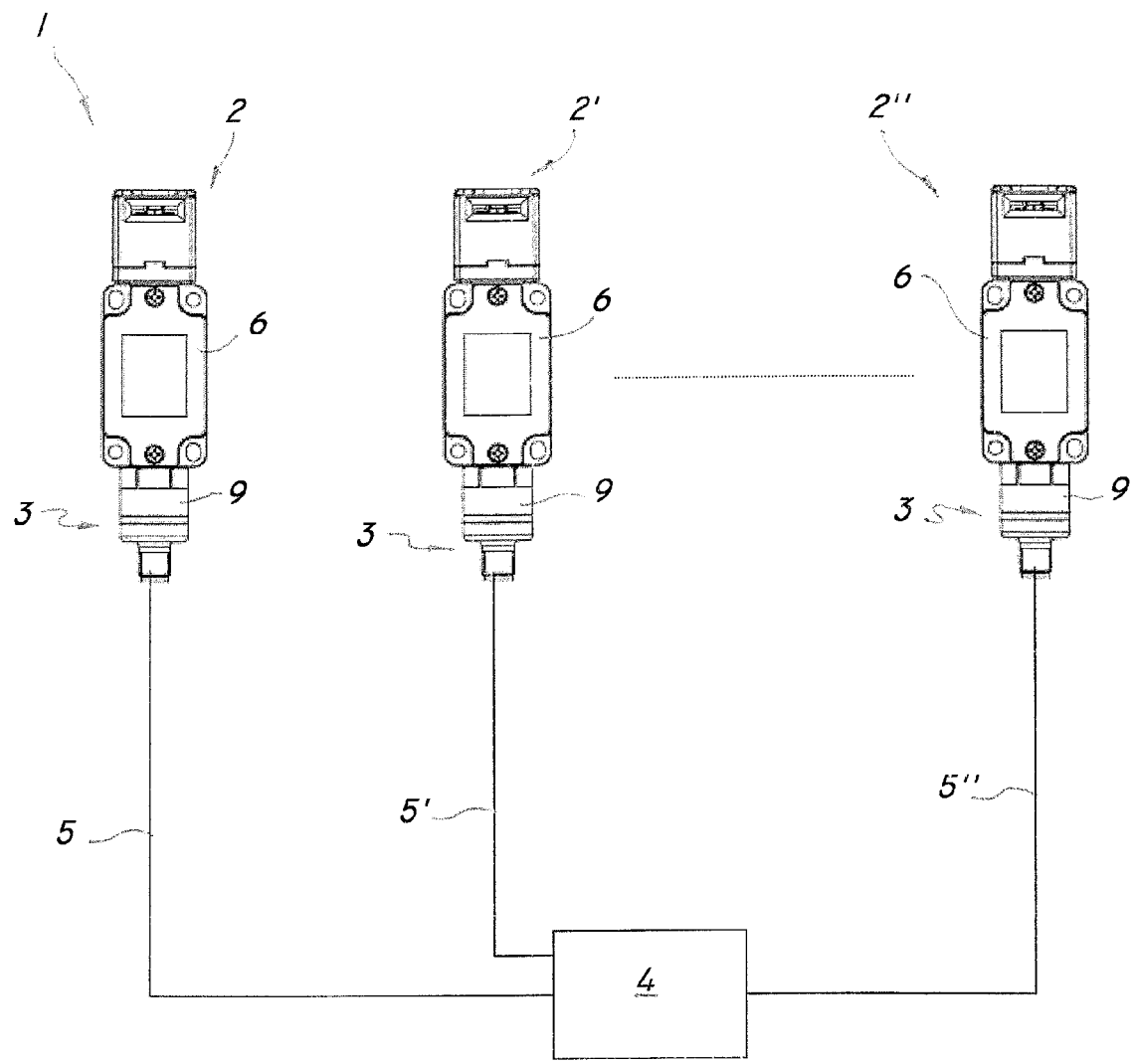
FIG. 1 is a schematic view of a system comprising a plurality of switch assemblies according to the invention, which are connected to a control unit via respective field buses.
Figure 2:
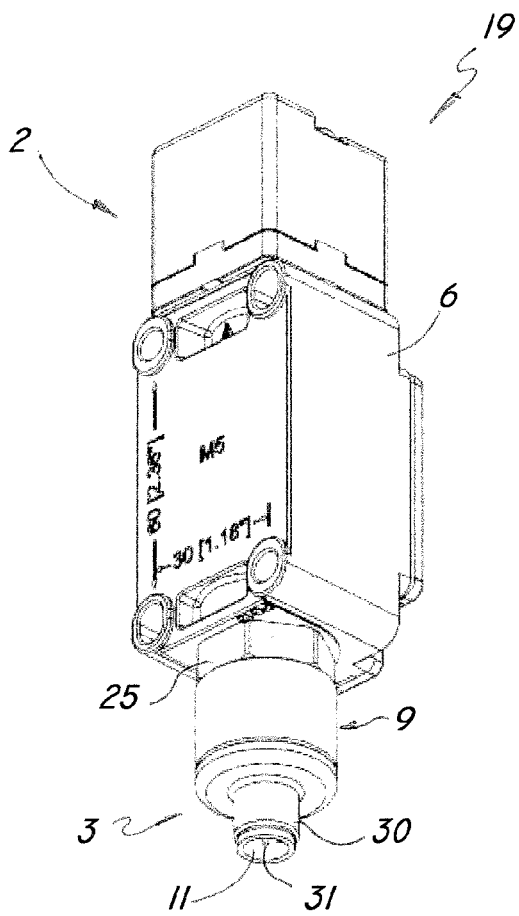
FIG. 2 is a perspective view of a switch assembly comprising an adapter and a switch device according to respective first preferred configurations.

FIG. 1 shows a system, generally designated by numeral 1, comprising a plurality of switch devices 2, 2', 2" connected to respective adapters 3 according to the present invention, which are adapted to connect them to a common central electronic control unit 4 via respective field buses 5, 5', 5".

The devices 2, 2', 2" may be of known and commercially available type. In a preferred embodiment, the devices may be safety switch devices.

Figure 4:
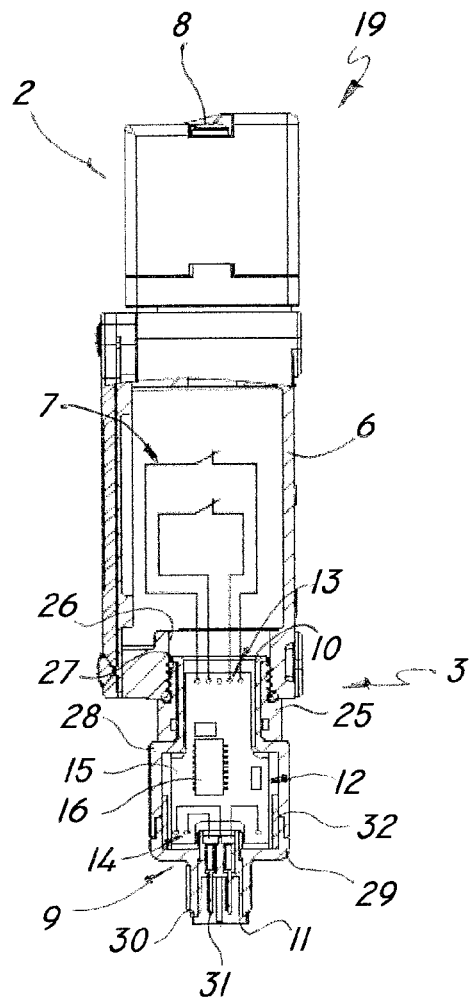
FIG. 4 is a lateral broken-away view of the assembly of FIG. 2.

Each switch device 2, 2', 2" may be electrically connected to a system to be controlled, not shown, and comprises a box-like body or case 6 housing therein switching means 7, as simply schematically shown in FIG. 4, which are adapted to control opening/closing of one or more electric power supply and/or auxiliary circuit of the system.

In the prior art, the switching means 7 may comprise one or more pairs of fixed contacts connected to the electric terminals of respective circuits and adapted for interaction with one or more moving contacts associated with an actuator 8 for opening/closing the circuits, thereby generating corresponding electric signals.

The adapter 3 of the invention is adapted to connect the corresponding switch device 2, 2', 2" to a corresponding data bus 5, 5', 5" such that it can communicate with the control unit 4 and exchange information therewith.

Particularly, the adapter 3 is designed to change the electric signals generated by the switching means 7 into data signals to be transmitted to the control unit 4 or, conversely, to transfer the data signals from the control unit 4 and convert them into electric control signals for the switching means 7, in operating modes that are typically used in these systems and will not be described in further detail below.

Figure 3:
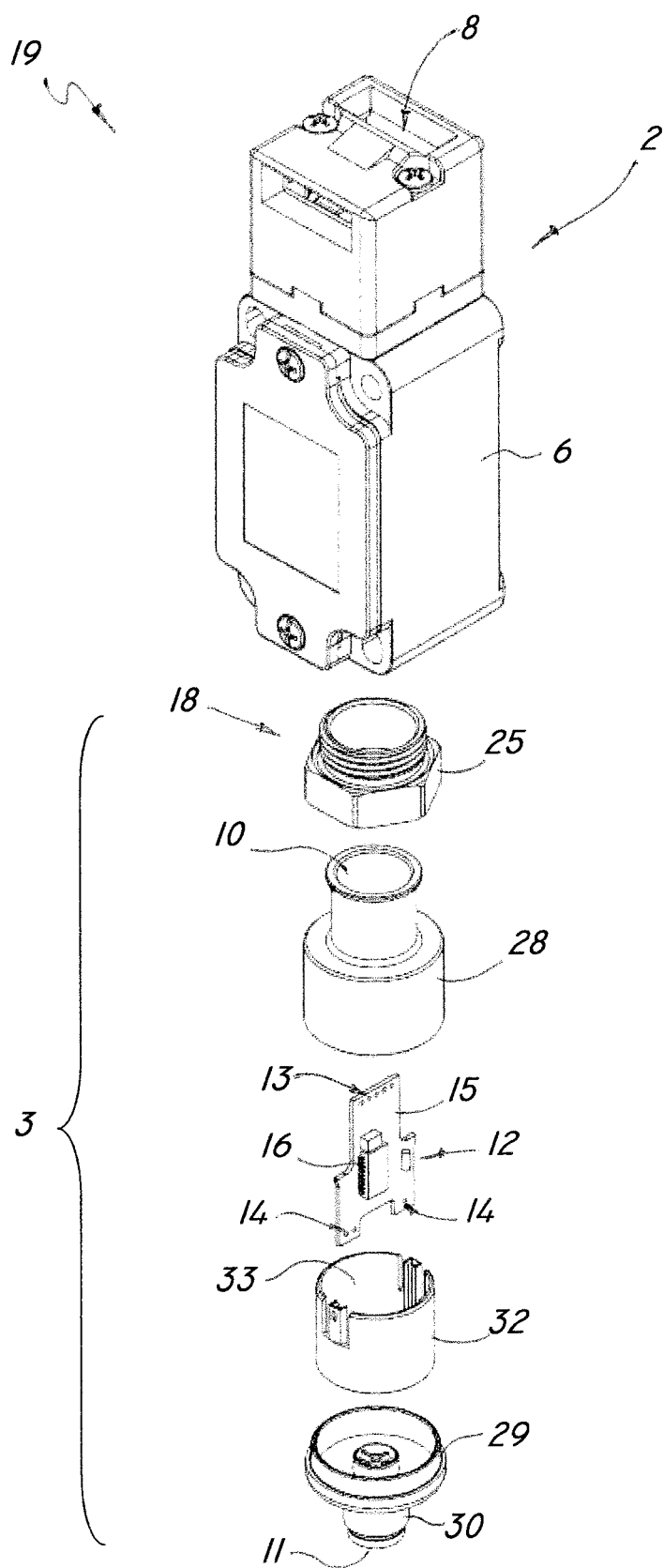
FIG. 3 is a perspective view of the assembly of FIG. 2 with the adapter in an exploded configuration.
Figure 5:
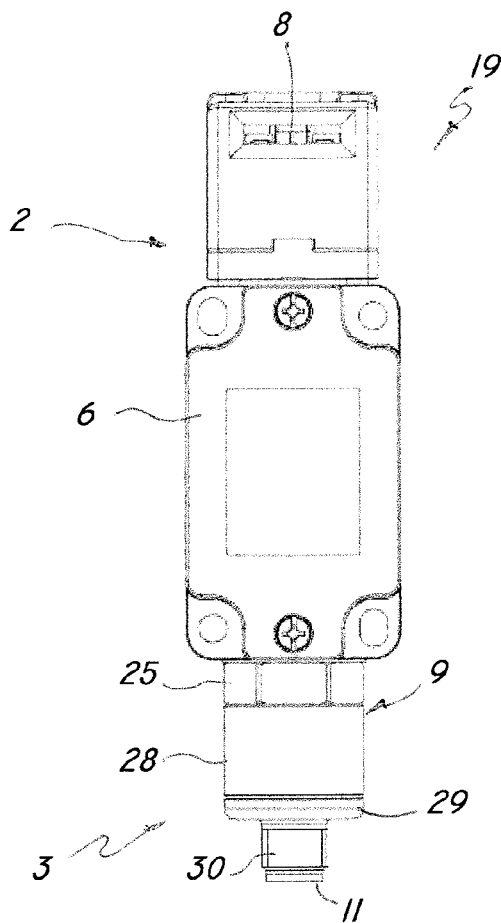
FIG. 5 is a front view of the assembly of FIG. 2.
Figure 6:
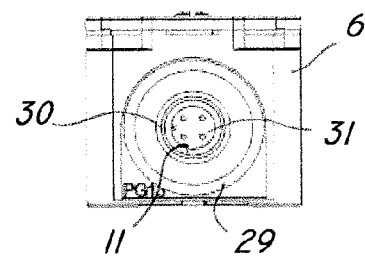
FIG. 6 is a bottom front view of the assembly of FIG. 2.

As more clearly shown in FIGS. 3 and 4, the adapter 3 essentially comprises a case 9, which is adapted to be secured to the box-like body 6 of its respective device 2.

The case has a first opening 10 and a second opening 11, and has an electronic control unit 12 accommodated therein, for converting the electric signals generated by the switch means 7 into data signals and vice versa, as explained above.

Particularly, the electronic unit 12 comprises first connection means 13, which are adapted to be connected to the switch means 7 through the first opening 10 and second connection means 14 which are adapted to be connected to respective data buses 5 through the second opening 11.

In a preferred, exemplary embodiment of the present invention, the electronic control unit 12 comprises a microprocessor electronic board 15 having processing means 16 for converting electric signals into data signals and vice versa according a predetermined data protocol.

In a particularly preferred embodiment, the electronic board 15 may be configured to operate with an AS-i standard-compliant data protocol.

Nevertheless, it shall be understood that the above configuration is intended by way of example and without limitation, and the electronic board 15 may operate according to any commercially available or specially designed standard.

Furthermore, the electronic board 15 may include memory means, located in the processing means 16, which are adapted to store a unique ID address of the switch device 2, to allow unique identification of each device 2, 2', 2" of the system by the electronic unit 4.

Figure 8:
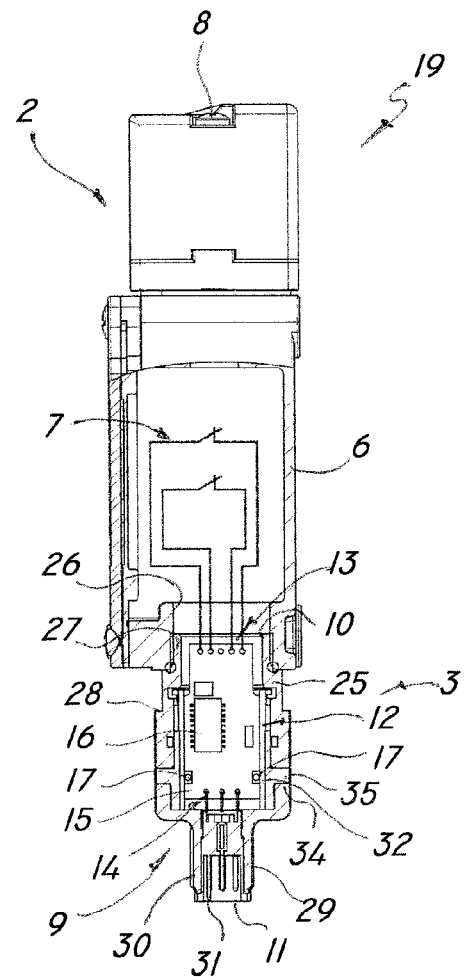
FIG. 8 is a lateral broken-away view of the assembly of FIG. 7.
Figure 7:
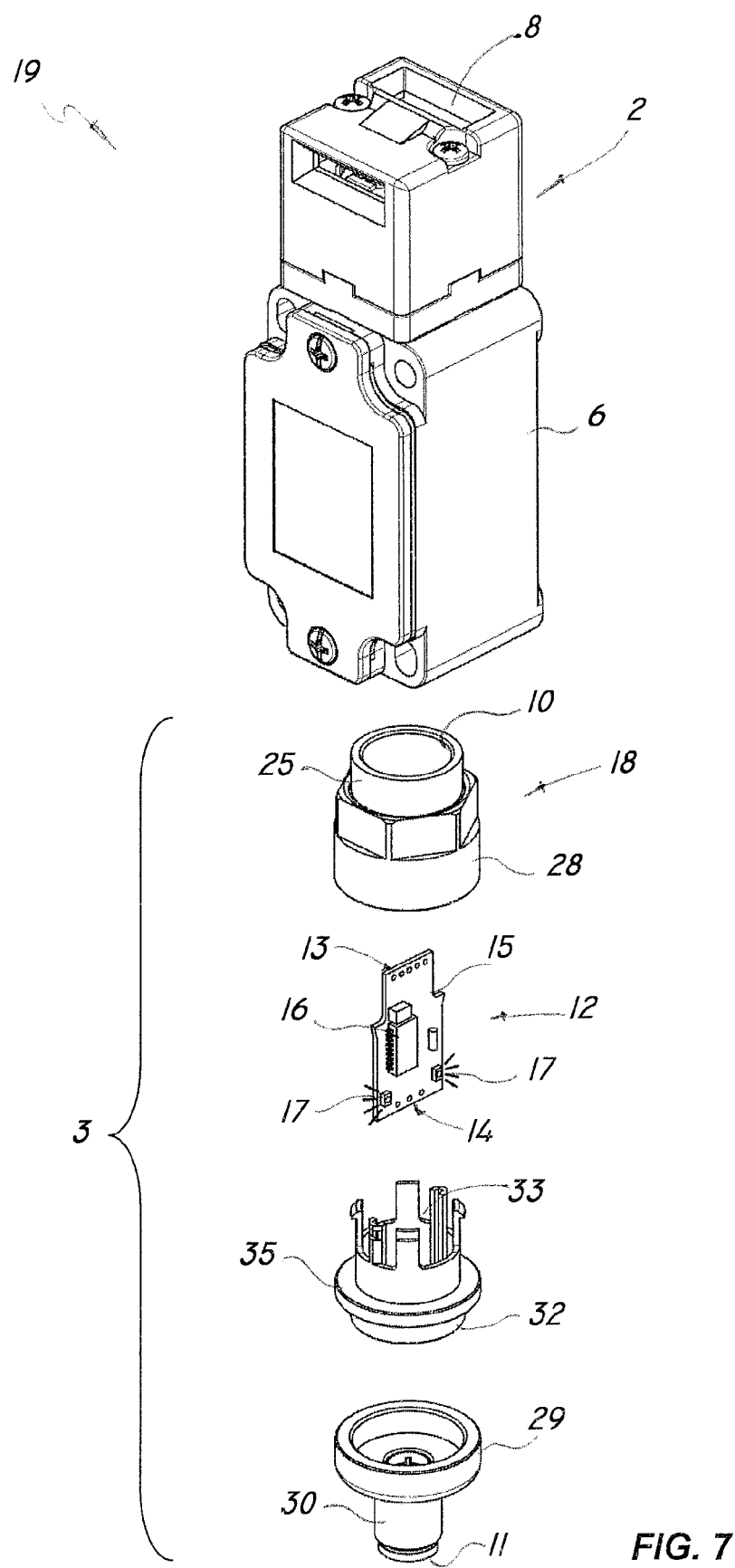
FIG. 7 is a perspective view of a switch assembly comprising the switch device of FIG. 2, coupled to an adapter according to a second preferred configuration, as shown in an exploded view.

In an alternative configuration, as shown in FIGS. 7 and 8, the electronic board 15 may comprise one or more LEDs 17, which are adapted to indicate actuation and/or proper operation of the board 15.

In a particularly advantageous aspect of the invention, the case 9 comprises universal anchor means 18 for attachment to the box-like body 6 of the switch device 2.

Conveniently, the anchor means 18 are located at the first opening 10 of the case 9, such that the adapter 3 may be directly mounted to its respective device 2 and a particularly compact assembly may be obtained, having dimensions similar to the typical dimensions of the prior art switch devices having an integrated data bus interface.

Furthermore, the use of universal anchor means 18 allows the adapter 3 to be mounted to various types of switch devices and particularly traditional switch devices, which are adapted to operate without being connected to a data bus.

Preferably, the switch devices 2, 2', 2" have anchor means whose shape mates the shape of the adapter.

Figure 9:
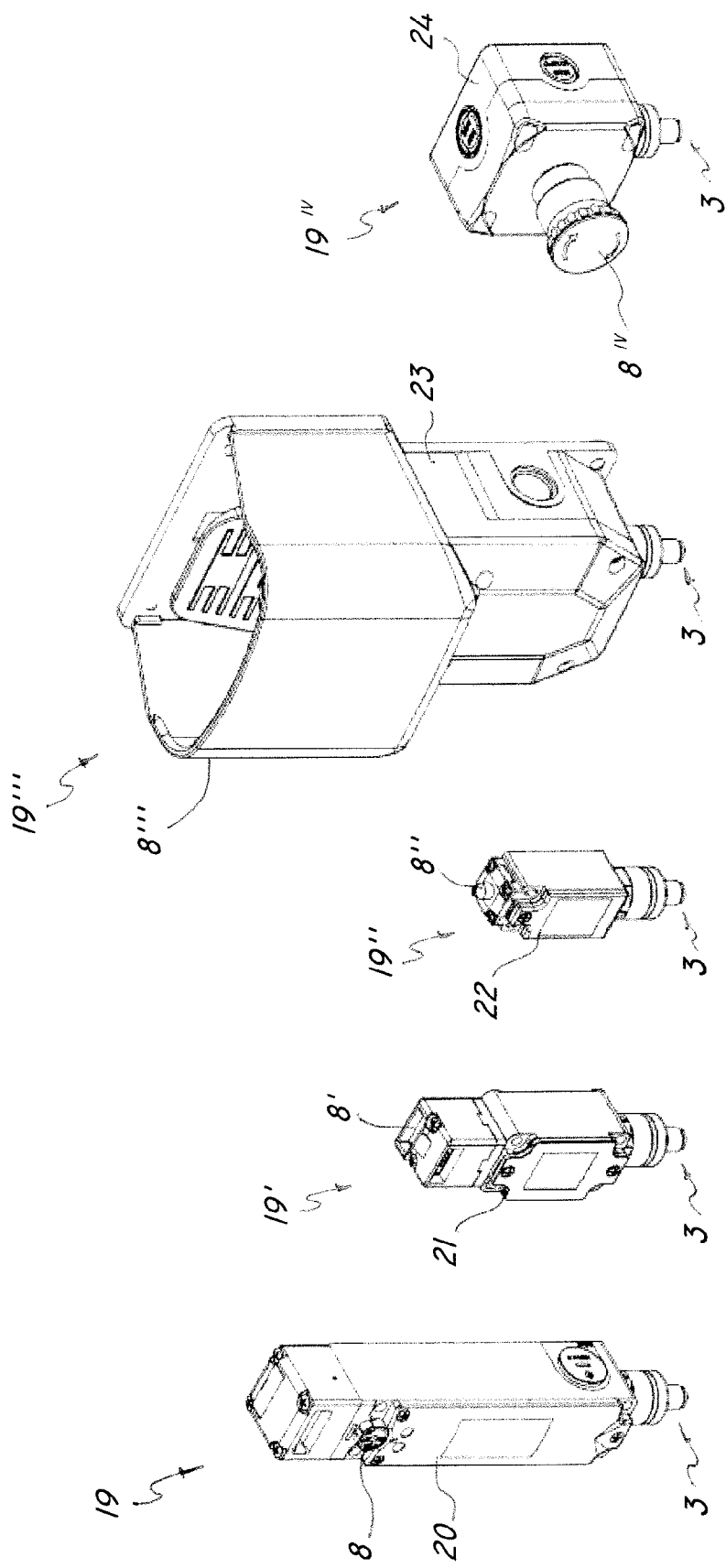
FIG. 9 shows further configurations of an assembly of the invention, in which each configuration comprises a switch device according to various embodiments, coupled to an adapter.

FIG. 9 show a few possible configurations of an assembly 19, 19', 19", 19''', 19$^{iv}$ of the invention, that shall be intended without limitation.

These assemblies 19, 19', 19", 19''', 19$^{iv}$ essentially differ from one another in the types of switch devices 20, 21, 22, 23, 24 associated with the adapter 3. Particularly, the switch devices 20, 21, 22, 23, 24 may differ from one another in the shape of their respective box-like bodies 6, possibly in their respective switching means 7, and also in the types of the respective actuators 8, 8', 8", 8''', 8$^{iv}$, that may be selected from key-, button-, slider-, pedal, emergency mushroom-operated actuators or actuators of any other known type.

The anchor means 18 of the adapter 3 may be of quick-release, snap-fit type, or the like.

In the preferred configurations as shown in FIGS. 3 and 7, the anchor means 18 comprise a threaded ring nut 25, that is adapted to be tightened on a matingly threaded surface 27 of a passage 26 of the box-like body 6 of the switch device 2.

In an alternative configuration, that may correspond, for instance, to the configuration of the assembly 19$^{iv}$, the ring nut 25 may be introduced into the box-like body 6 and be locked by a matingly threaded nut, not shown, within the body 6.

The ring nut 25 is adapted to be coupled to a first end element 28 of the case 9, which has a substantially tubular shape and has the first opening 10 formed therein.

In FIG. 3, the first end element 28 and the ring nut 25 are rotatably coupled, such that the adapter 3 is allowed one degree of rotational freedom relative to the device 2.

Conversely, in FIG. 7 the ring nut 25 and the first end element 28 are integrally formed.

The case 9 further comprises a second end element 29 equipped with the second connection means 14 that may be selected from those commercially available, and whose configuration will also depend on the type of data bus 5 with which the device 2 has to be connected.

For example, the second connection means 14 may include a multipole connector 30 having a plurality of connection elements 31, each with a first end connected to the board 15 and a second end designed to be connected to the data bus 5.

The first connection means 13 associated with the board 15 may be selected from the group comprising weld pins, quick-connect pins, clamps, multipole connections and the like.

The first and second end elements 28, 29 of the case 9 may be easily and removably connected, for easy assembly of the adapter 3.

Particularly, the case 9 also comprises a substantially tubular intermediate element 32 interposed between the first and second end elements 28, 29 and having a seat 33 for stable and removable accommodation of the electronic board 15.

As is apparent from the comparison of FIGS. 3 and 7, the intermediate element 32 may have a differentiated configuration depending on whether the electronic board 15 is equipped with LEDs 17 or not.

If LEDs 17 are provided, then appropriate openings 34 have to be formed in the case, and respective openings or optically transparent or translucent areas have to be provided in the intermediate element 32 for the LEDs 17 to be visible from the outside.

For example, as shown in FIGS. 7 and 8, the intermediate element may have an at least partially transparent or translucent annular projection, which is adapted to fit into the opening 34 to be interposed between the first end element 28 and the second end element 29 and allow the light emitted by the LEDs 17 to be diffused therethrough.

It shall be finally noted that, while the case 9 has a substantially cylindrical shape in the annexed figures, it may be configured in any manner, without departure from the scope of the present invention.

The above disclosure clearly shows that the invention fulfills the intended objects and particularly meets the requirement of providing an adapter that allows connection of a switch device with a data bus even when this device has not been specially designed for such operation.

The adapter and assembly of the invention are susceptible to a number of changes or variants, within the inventive concept disclosed in the appended claims. All the details thereof may be replaced by other technically equivalent parts, and the materials may vary depending on different needs, without departure from the scope of the invention.

While the adapter and assembly have been described with particular reference to the accompanying figures, the numerals are only used for the sake of a better intelligibility of the invention and shall not be intended to limit the claimed scope in any manner.

The invention claimed is:

1. An adapter for connecting a switch device (2) to a data bus (5), wherein the switch device (2) comprises a box-shaped body (6) housing a switching unit (7) configured to switch an electric circuit, the adapter comprising:
    a case (9) having a first opening (10) and a second opening (11); and
    an electronic control unit (12) housed in said case (9) and having a first connection element (13) adapted to be connected to the switching unit (7) through said first opening (10) and a second connection element (14) adapted to be connected to the data bus (5) through said second opening (11) to convert electric signals generated by the switching unit (7) into data signals and vice versa,
    wherein said case (9) comprises a universal anchoring member (18) configured to anchor to the box-shaped body (6) of the switch device (2) at said first opening (10), and
    wherein said anchoring member (18) comprises an external threaded nut (25) screwable into a passage (26) of the box-shaped body (6) of the switch device (2), which is provided with an internally counter-threaded surface (27) for realizing a particularly compact assembly.

2. The adapter as claimed in claim 1, wherein said electronic control unit (12) comprises a microprocessor electronic board (15) provided with a processing unit (16) adapted to convert electric signal into data signals and vice versa according to a predetermined data protocol.

3. The adapter as claimed in claim 2, wherein said first connection element (13) is selected from the group consisting of weldable pins, quick connection pins, clamps, or multipole connections, and wherein said second connection element (14) comprises a multipole connector (30) having a plurality of connection elements (31) each having a first end connected to said microprocessor electronic board (15) and a second end electrically connectable to the data bus (5).

4. The adapter as claimed in claim 2, wherein said predetermined data protocol comprises a AS-i interface.

5. The adapter as claimed in claim 2, wherein said electronic board (15) comprises a memory unit adapted to start a unique identification address of the switch device (2).

6. The adapter as claimed in claim 2, wherein said electronic board (15) comprises at least one LED (17) for signalling one or both of activation or operation of said board (15).

7. The adapter as claimed in claim 3, wherein said case (9) comprises a first end member (28) provided with said anchoring member (18) and a second end member (29) provided with said multipole connector (30) and removably couplable with said first end member (27) by interposition of a substantially tubular intermediate member (32) having a seat (33) for removably housing said multiprocessor electronic board (15).

8. A switch assembly (19) comprising:
    a switch device (2) having a box-shaped body (6) housing a switching unit (7); and
    an adapter (3) according to claim 1,
    wherein said switch device (2) and said adapter (3) comprise a mating shaped anchoring system (19, 27) configured for anchoring thereof.

* * * * *